(12) United States Patent
Hazeyama et al.

(10) Patent No.: US 9,722,465 B2
(45) Date of Patent: Aug. 1, 2017

(54) STATOR FOR ROTATING ELECTRIC MACHINE AND METHOD FOR MANUFACTURING STATOR FOR ROTATING ELECTRIC MACHINE

(71) Applicant: Mitsubishi Electric Corporation, Chiyoda-ku (JP)

(72) Inventors: Moriyuki Hazeyama, Chiyoda-ku (JP); Hideaki Arita, Chiyoda-ku (JP); Yoshihiro Miyama, Chiyoda-ku (JP); Akihiro Daikoku, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 506 days.

(21) Appl. No.: 14/402,040

(22) PCT Filed: Jun. 4, 2013

(86) PCT No.: PCT/JP2013/065457
§ 371 (c)(1),
(2) Date: Nov. 18, 2014

(87) PCT Pub. No.: WO2013/183630
PCT Pub. Date: Dec. 12, 2013

(65) Prior Publication Data
US 2015/0130322 A1    May 14, 2015

(30) Foreign Application Priority Data

Jun. 8, 2012 (JP) .................................. 2012-130703

(51) Int. Cl.
*H02K 1/16* (2006.01)
*H02K 3/34* (2006.01)
(Continued)

(52) U.S. Cl.
CPC ............. *H02K 1/165* (2013.01); *H02K 1/146* (2013.01); *H02K 3/345* (2013.01); *H02K 15/02* (2013.01);
(Continued)

(58) Field of Classification Search
CPC ........ H02K 15/02; H02K 1/146; H02K 1/165; H02K 2213/03; H02K 3/345; Y10T 29/49009
(Continued)

(56) References Cited

U.S. PATENT DOCUMENTS

2010/0123426 A1* 5/2010 Nashiki .................... H02K 1/12
318/701
2010/0141078 A1* 6/2010 Kouda ...................... H02K 3/12
310/195
(Continued)

FOREIGN PATENT DOCUMENTS

JP    2006 166610    6/2006
JP    2009 153290    7/2009
(Continued)

OTHER PUBLICATIONS

International Search Report Issued Aug. 20, 2013 in PCT/JP13/065457 Filed Jun. 4, 2013.

*Primary Examiner* — Alex W Mok
(74) *Attorney, Agent, or Firm* — Oblon, McClelland, Maier & Neustadt, L.L.P.

(57) ABSTRACT

A tooth of a stator has a tapered shape in which a tooth width decreases toward a distal end portion thereof. A winding is formed of an edgewise winding wound around the tooth in a row. The winding is supplied with power so that a terminal on a base portion side of the tooth may have a higher voltage than that of a terminal on the distal end portion side thereof. A tooth width $T_h$ of the base portion is set within the range (Continued)

of $T_{min} < T_h < 1.25 T_{ha}$ defined by a tooth width $T_{ha}$ that maximizes an index using an outer radius and a core back width of a stator core, a clearance of the windings in the slot, a winding width, an air gap between the teeth and the winding, a pitch of the slot, and an inclination angle of the winding, and a permissible lower limit $T_{min}$.

9 Claims, 13 Drawing Sheets

(51) Int. Cl.
*H02K 15/02* (2006.01)
*H02K 1/14* (2006.01)

(52) U.S. Cl.
CPC ..... *H02K 2213/03* (2013.01); *Y10T 29/49009* (2015.01)

(58) Field of Classification Search
USPC .............................. 310/215, 216.069; 29/596
See application file for complete search history.

(56) References Cited

U.S. PATENT DOCUMENTS

| | | | |
|---|---|---|---|
| 2011/0095639 A1* | 4/2011 | Nakamura | H02K 3/28 310/207 |
| 2011/0127875 A1* | 6/2011 | Pulnikov | H02K 3/493 310/195 |
| 2012/0001516 A1* | 1/2012 | Hisada | H02K 1/165 310/216.069 |
| 2012/0038230 A1* | 2/2012 | Kurahara | H02K 1/165 310/71 |
| 2013/0062973 A1* | 3/2013 | Yoshimura | H02K 15/022 310/43 |
| 2013/0097852 A1* | 4/2013 | Haruno | H02K 15/02 29/596 |

FOREIGN PATENT DOCUMENTS

| | | |
|---|---|---|
| JP | 2010 4723 | 1/2010 |
| JP | 2010 114998 | 5/2010 |
| JP | 2010 220387 | 9/2010 |
| JP | 2011 254689 | 12/2011 |

* cited by examiner

STATOR FOR ROTATING ELECTRIC MACHINE AND METHOD FOR MANUFACTURING STATOR FOR ROTATING ELECTRIC MACHINE

TECHNICAL FIELD

The present invention relates to a stator for a rotating electric machine to be used in a vehicle drive motor, such as for an electric vehicle and a hybrid vehicle, and more particularly, to a stator for a rotating electric machine and a method of manufacturing a stator for a rotating electric machine, each of which takes into consideration magnetic saturation alleviation of a stator core and dielectric strength between windings.

BACKGROUND ART

Hitherto, in a rotating electric machine, in order to realize the structure for alleviating magnetic saturation of a stator core, a tooth portion is formed into a tapered shape and a tooth pitch and a taper angle are set to be equal to each other. Also in order to increase a winding space factor to realize torque improvement, a track-shaped winding obtained by bending a rectangular wire (rectangular in cross section) in an edgewise direction is used (see, for example, Patent Literature 1).

CITATION LIST

Patent Literature

[PTL 1] JP 2006-166610 A

SUMMARY OF INVENTION

Technical Problems

In the related-art stator for a rotating electric machine, the taper angle and the tooth pitch are set to be equal to each other, resulting in a problem in that an electrical clearance cannot be ensured when the edgewise winding is employed.

Further, if an electrical clearance is to be ensured, a clearance between teeth is uniformly increased, resulting in a problem in that a dead space is generated.

In addition, if a clearance between windings is increased, the winding is reduced in size and a tooth width is reduced, resulting in a problem in that a loss of the rotating electric machine (motor) is increased.

The present invention has been made in order to solve the above-mentioned problems, and it is an object thereof to provide a stator for a rotating electric machine and a method of manufacturing a stator for a rotating electric machine, which are capable of ensuring a phase-to-phase electrical clearance in a region where insulation is difficult to be achieved and ensuring a wider tooth distal end portion than that of the related-art structure, to thereby enhance output torque of the rotating electric machine.

Solution to Problems

According to one embodiment of the present invention, there is provided a stator for a rotating electric machine, which is to be arranged to be opposed to a rotor, the rotor having a different magnetic resistance depending on a rotational position thereof, the stator being configured to construct a rotating electric machine together with the rotor, the stator including: a stator core; teeth and slots, which are formed at equal pitches at portions of the stator core to be opposed to the rotor; and a winding that is wound around each of the teeth so as to be arranged in each of the slots. The teeth are each formed to protrude toward an outer circumferential surface of the rotor and each have a tapered shape in which a tooth width decreases toward a distal end portion thereof. The winding includes an edgewise winding wound around the each of the teeth in a row, and is configured to be supplied with power so that a terminal on a base portion side of the each of the teeth has a higher voltage than a voltage of a terminal on the distal end portion side of the each of the teeth. The base portion of the each of the teeth has a tooth width $T_h$ that is set within a range of $T_{mim} < T_h < 1.25 T_{ha}$ defined by a tooth width $T_{ha}$ that maximizes a value of Expression (6) described later that represents an index F ($T_h$) of insulating performance, loss performance, and magnetic saturation performance, and a permissible lower limit $T_{min}$. In Expression (6), D represents an outer radius of the stator core, $T_C$ represents a core back width of the stator core, h represents a winding width, a represents an air gap between the each of the teeth and the winding, α represents a pitch of the each of the teeth and the each of the slots, and β represents an inclination angle of the winding.

Further, according to one embodiment of the present invention, there is provided a method of manufacturing a stator for a rotating electric machine, the method including: a first step of manufacturing a stator core so that teeth are formed to protrude from an inner circumferential portion of the stator core at equal pitches, the teeth each having a tapered shape in which a tooth width decreases toward a distal end portion thereof; a second step of manufacturing a coil with an edgewise winding; a third step of inserting the coil manufactured in the second step into a first insulating member in order to insulate the coil from the stator core manufactured in the first step; a fourth step of inserting the first insulating member, which has the coil inserted therein in the third step, into the stator core; a fifth step of arranging the stator core, which has the first insulating member inserted therein in the fourth step, in an annular pattern; a sixth step of fitting the stator core, which is arranged in the annular pattern in the fifth step, into a frame; and a seventh step of inserting a second insulating member into a clearance between a first coil and a second coil adjacent to the first coil among the coils in the stator core fitted into the frame in the sixth step.

Advantageous Effects of Invention

According to one embodiment of the present invention, it is possible to ensure the phase-to-phase electrical clearance in the region where insulation is difficult to be achieved and ensure the wider tooth distal end portion than that of the related-art structure, and hence the output torque of the rotating electric machine can be enhanced.

DESCRIPTION OF EMBODIMENTS

First Embodiment

Figure 1:
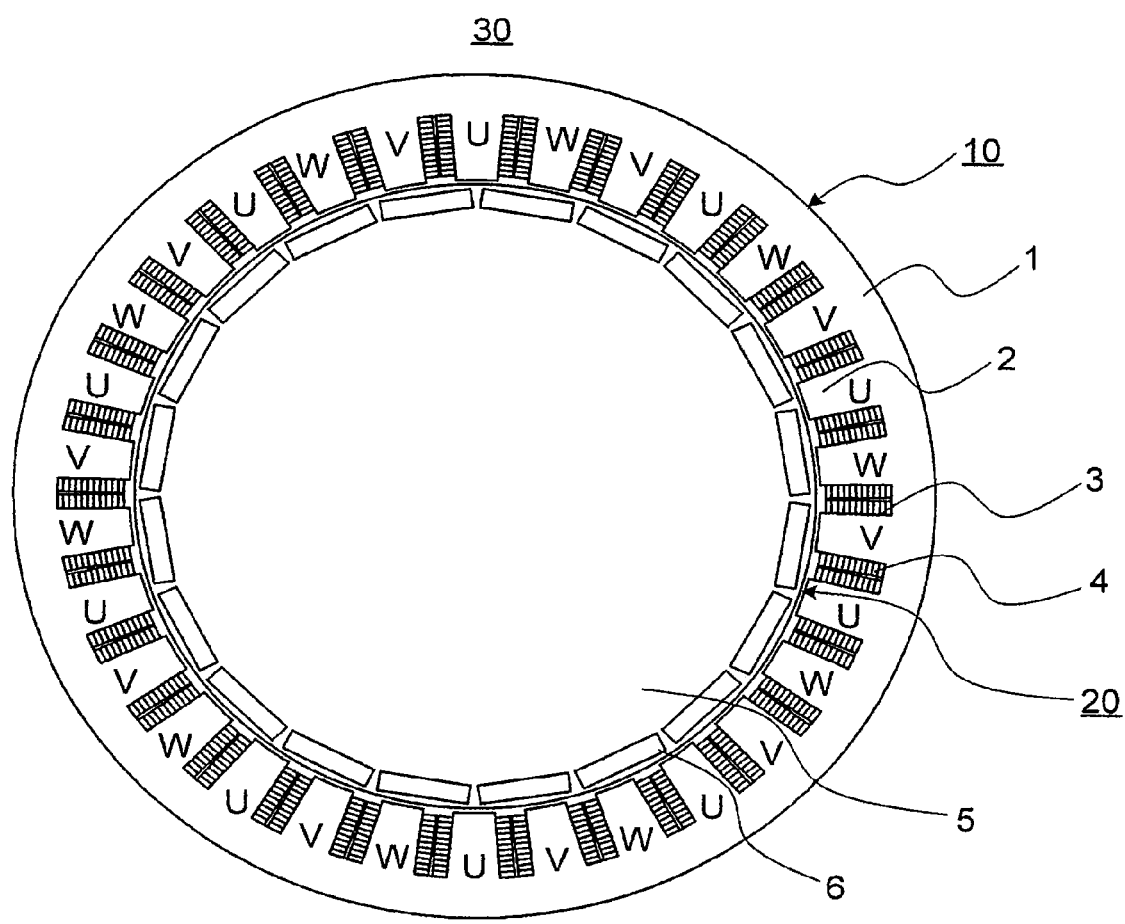
FIG. 1 is a cross-sectional diagram illustrating a stator as well as a rotor of a rotating electric machine according to a first embodiment of the present invention.

FIG. 1 is a cross-sectional diagram illustrating a stator as well as a rotor for a rotating electric machine according to a first embodiment of the present invention, and illustrates the case where a rotating electric machine 30 is a three-phase motor.

In FIG. 1, the rotating electric machine 30 such as a vehicle drive motor includes a stator 10 having a ring-shaped cross section and a rotor 20 arranged in the stator 10 in a freely rotatable manner.

The stator 10 includes a stator core 1, teeth 2 formed to protrude from an inner circumferential portion of the stator core 1 at equal pitches, slots 3 formed between the respective teeth 2, and rectangular windings 4 arranged in the respective slots 3.

The rotor 20 includes a rotor core 5 and rectangular magnets 6 embedded in an outer circumferential portion of the rotor core 5 at equal pitches. The rotor 20 is located on an inner side of the stator 10 to have a different magnetic resistance depending on a rotational position thereof.

As illustrated in FIG. 1, the protruding teeth 2, together with the windings 4 wound around the respective teeth 2, form ten three-phase (U-phase, V-phase, W-phase) coils, for example. Thirty teeth 2 are arranged so as to be opposed to twenty magnets 6 arranged on the rotor core 5.

In this case, the windings 4 are wound around the respective teeth 2 in the counterclockwise direction in the order of the U-phase, the V-phase, and the W-phase.

Figure 2:
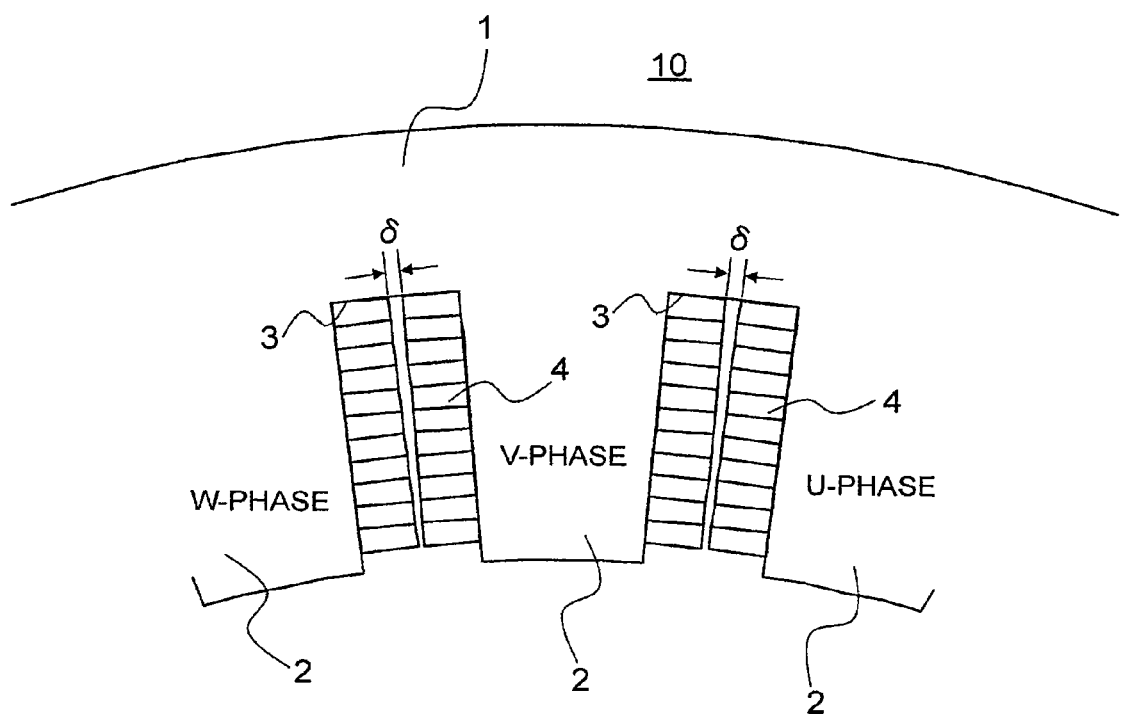
FIG. 2 is an enlarged cross-sectional diagram of three-phase teeth of the stator illustrated in FIG. 1.

FIG. 2 is an enlarged cross-sectional diagram of the three-phase (three) teeth 2 illustrated in FIG. 1.

In FIG. 2, the edgewise winding 4 using a rectangular wire is wound in a row around each of the teeth 2 of the U-phase, the V-phase, and the W-phase.

Further, in the slot 3, an insulating member (not shown) such as insulating paper is interposed between the stator core 1 and the winding 4 and between the tooth 2 and the winding 4.

A clearance δ between the windings 4 (clearance between the slots 3) is set to be larger at a base portion of the tooth 2 (stator core 1 side) and be smaller toward a distal end portion of the tooth 2 (magnet 6 side of the rotor 20).

Further, as described later with reference to FIG. 4, each tooth 2 has a tapered shape in which the width of the tooth 2 becomes smaller toward an outer circumferential surface of the rotor 20.

Figure 3:
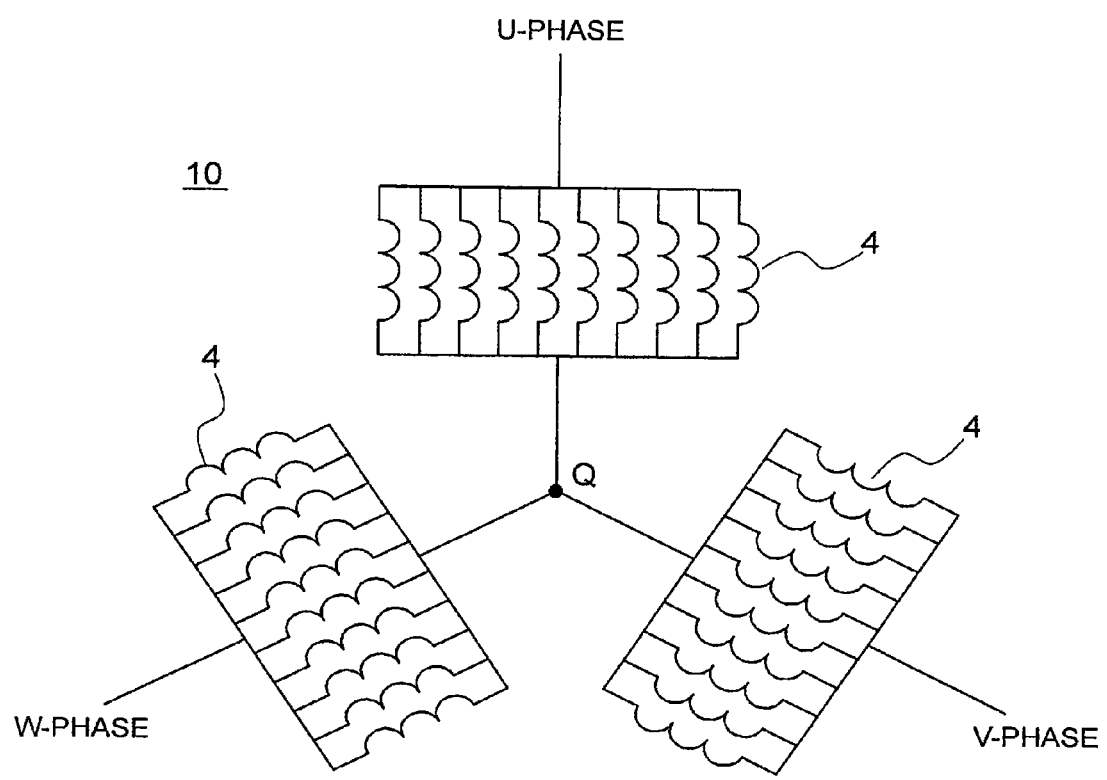
FIG. 3 is an explanatory diagram illustrating a connection state of respective windings of the stator illustrated in FIG. 1.

FIG. 3 is an explanatory diagram illustrating a connection state of the respective windings 4 of the stator 10.

In FIG. 3, thirty windings 4 forming three-phase coils are star-connected around a neutral point Q so that ten windings 4 are arranged in parallel for each of the U-phase, the V-phase, and the W-phase.

In other words, the number of parallel connections of the windings 4 is set to a greatest common divisor P (=10) of the number of poles of the magnets 6 (20) and the number of the slots 3 (30).

Figure 4:
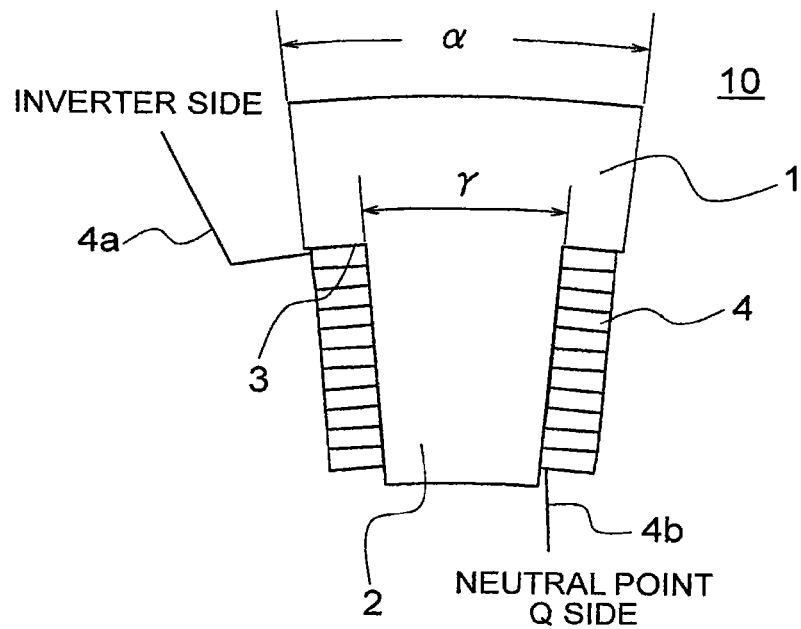
FIG. 4 is a cross-sectional diagram illustrating a connection position of a winding on a single tooth of FIG. 1 to an inverter.

FIG. 4 is a cross-sectional diagram illustrating a connection position of the winding 4 on a single tooth 2 with respect to an inverter (not shown).

In FIG. 4, the tooth 2 of the stator 10 has a taper angle Y to have a tapered shape in which the width of the base portion (stator core 1 side) is larger than the width of the distal end portion (outer circumferential surface side of the rotor 20). Further, the teeth 2 and the slots 3 are formed at the same pitch α.

The winding 4 is wound around the tooth 2 so that a terminal 4a located at the base portion of the tooth 2 (stator core 1 side) is connected to the inverter (high voltage side) and a terminal 9b located at the distal end portion of the tooth 2 (magnet 6 side of the rotor 20) is connected to the neutral point Q (low voltage side).

In this case, a line voltage is applied from the inverter to the terminal 4a located at the base portion of the tooth 2.

Specifically, the stator 10 is used for the rotating electric machine 30 that includes the stator 10 formed of the stator core 1 including the winding 4 received in the slot 3, and the rotor 20 located in the stator 10 and formed of the rotor core 5 including the magnet 6. The stator core 1 is constructed so that the edgewise winding 4 is wound in a row in a concentrated manner around the tooth 2 protruding toward the surface of the rotor 20. The insulating member is provided between the stator core 1 and the winding 4 and between the tooth 2 and the winding 4.

Next, a method of deriving a mathematical expression satisfying insulating performance, magnetic saturation performance, and loss performance of the stator 10 is described with reference to FIGS. 5 to 7.

Figure 5:
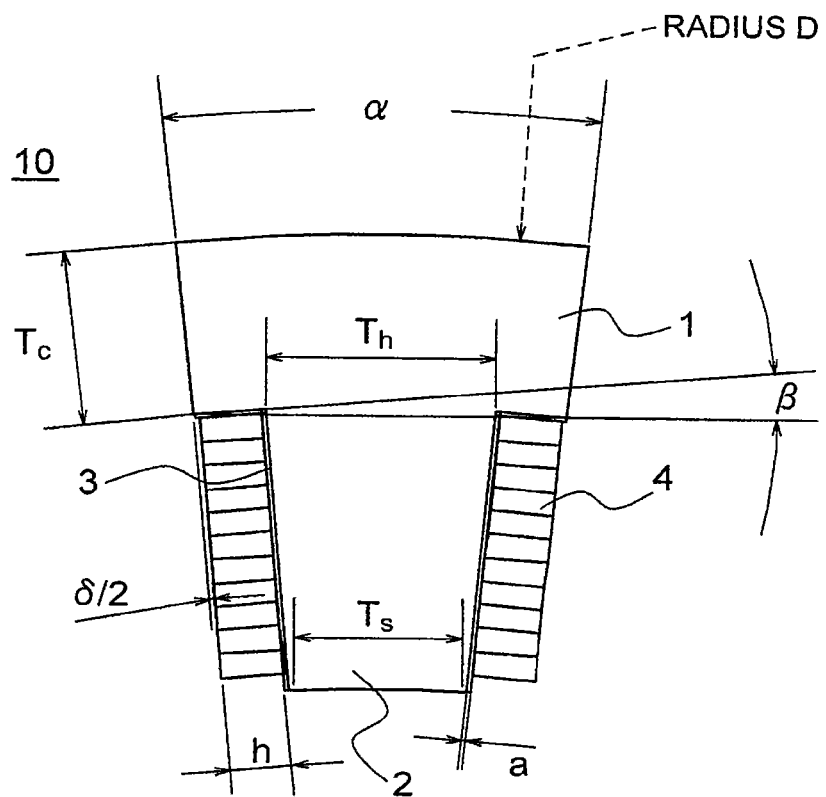
FIG. 5 is a cross-sectional diagram illustrating various dimensions of a single tooth according to the first embodiment of the present invention.

FIG. 5 is a cross-sectional diagram illustrating various dimensions of a single tooth 2. Note that, FIG. 5 omits the illustration of adjacent teeth but illustrates only a bottom center portion of the slot 3 as the tooth 2 being a center, and hence the clearance δ between the slots 3 (between the windings 4) is illustrated as a half clearance δ/2.

FIG. 5 illustrates a radius D of the stator core 1, a core back width $T_C$ of the stator core 1 at the bottom center of the slot 3, a tooth width $T_h$ of the tooth 2 at the base portion (stator core 1 side), a distal end width $T_S$ ($<T_h$) of the tooth 2, the half clearance δ/2 between the windings 4, a winding width h, an air gap a between the tooth 2 (stator core 1) and the winding 4 (thickness of the insulating member), the pitch α of the slot 3 (tooth 2), and an inclination angle β of the winding 4.

The tooth width increases monotonously toward the outer radial direction of the stator 10, and the clearance δ between the windings 4 increases monotonously toward the outer radial direction of the stator 10.

Further, as described above (FIG. 4), the winding 4 is supplied with power so that the terminal 4a at the base portion of the tooth 2 may have a higher voltage than that of the terminal 4b at the distal end portion of the tooth 2.

Now, a mathematical expression satisfying various kinds of performance of the stator 10 is derived as follows.

First, by using various dimensions illustrated in FIG. 5, a relational expression of the motor structure can be expressed by Expression (1).

$$\frac{\delta}{2} = (D - T_c)\tan\left(\frac{\alpha}{2}\right) - h - a - \frac{T_h}{2} * \frac{1}{\cos(\beta)} \quad (1)$$

In this case, by using an amount of magnetic flux φ linked to the stator 10 and an axial length Lc of the stator core 1 (vertical length in FIG. 5), a magnetic flux density B at the base portion of the tooth 2 corresponding to magnetic saturation performance of the stator 10 can be expressed by Expression (2).

$$B = \frac{\phi}{T_h * L_c} \quad (2)$$

Further, by using the clearance δ between the windings 4, insulating performance A of the stator 10 can be expressed by Expression (3) as the relational expression with a potential difference V between adjacent windings 4.

$$V = A * \delta \quad (3)$$

Note that, the volume effect is not particularly taken into consideration in Expression (3).

Subsequently, when an iron loss (eddy current loss) of the stator 10 is taken into consideration, the eddy current loss is proportional to the square of the magnetic flux density B, and hence a loss C of the stator 10 can be expressed by Expression (4).

$$C = B^2 \quad (4)$$

Expressions (2) to (4) indicate that magnetic saturation is reduced (magnetic saturation easily occurs) when the magnetic flux density B is large, that the insulating performance is decreased when the insulating performance A is large, and that the loss is large when the loss C is large.

Thus, in order to satisfy the insulating performance A, the magnetic saturation performance (magnetic flux density B), and the loss performance C of the stator 10, it is necessary to maximize Expression (5) expressed with use of a constant part E ($=Lc^3/\phi^3 * V$).

$$\frac{1}{A*B*C} = \frac{\delta}{V}*\left(\frac{T_h*L_c}{\phi}\right)^3 \quad (5)$$

$$= \frac{L_c^3}{\phi^3 * V}T_h^3 * \left[2*(D-T_c)\tan\frac{\alpha}{2} - 2(h+a) - \frac{T_h}{\cos(\beta)}\right]$$

$$= E*T_h^3*\left[2*(D-T_c)\tan\frac{\alpha}{2} - 2(h+a) - \frac{T_h}{\cos(\beta)}\right]$$

In addition, the terms after $T_h^3$ in Expression (5) can be expressed by a quartic function $F(T_h)$ of the tooth width $T_h$ of the base portion as in Expression (6).

$$F(T_h) = -\frac{T_h^4}{\cos(\beta)} + \left(2(D-T_c)\tan\frac{\alpha}{2} - 2(h+a)\right)T_h^3 \quad (6)$$

In this case, when $F(T_h)$ is differentiated with respect to the tooth width $T_h$, Expression (7) is obtained.

$$F'(T_h) = -4\frac{T_h^3}{\cos(\beta)} + 3\left(2(D-T_c)\tan\frac{\alpha}{2} - 2(h+a)\right)T_h^2 \quad (7)$$

In this case, Expression (6) shows an upward convex curve, and hence F' ($T_h$)=0 needs to be satisfied in order to maximize the value of F ($T_h$).

The solutions satisfying F' ($T_h$)=0 in Expression (7) in order to maximize the value of F ($T_h$) in Expression (6) are $T_h$=0 and $T_h=T_{ha}$. The tooth width $T_{ha}$ that maximizes the value of Expression (6) is expressed by Expression (8).

$$T_{ha} = \frac{3}{4}*\left(2(D-T_c)\tan\frac{\alpha}{2} - 2(h+a)\right)\cos(\beta) \quad (8)$$

Figure 6:
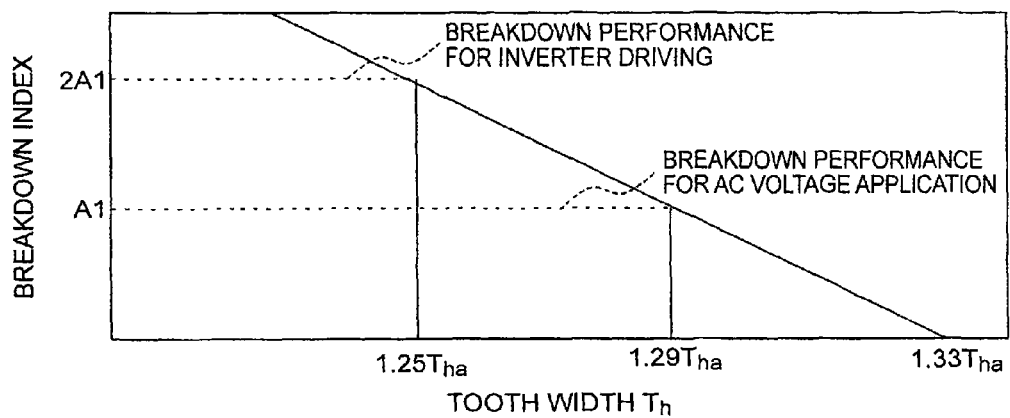
FIG. 6 is a graph showing a relationship between a tooth width and a breakdown index of the stator according to the first embodiment of the present invention.

FIG. 6 is a graph showing a relationship between the tooth width $T_h$ and a breakdown index (insulating performance A) of the stator 10.

In FIG. 6, the reference scale on the horizontal axis (tooth width $T_h$) is the tooth width $T_{ha}$ obtained by Expression (8), and the reference scale on the vertical axis (breakdown index) is expressed by a value A1 corresponding to the insulating performance A.

It is understood from FIG. 6 that, when the tooth width $T_h$ is 1.29$T_{ha}$, the breakdown index is A1, which satisfies the insulating performance A for AC application.

By the way, in the case of a vehicle drive motor such as for an electric vehicle and a hybrid vehicle, it is known that the breakdown performance required for inverter driving needs to be about twice as large as the breakdown performance A1 for AC voltage application (=2×A1).

As is apparent from FIG. 6, when the tooth width $T_h$ is $1.33T_{ha}$, the breakdown index is 0, and when the tooth width $T_h$ is $1.25T_{ha}$, the breakdown index is 2A1.

Thus, as shown in FIG. 6, it is necessary to set "tooth width $T_h \leq 1.25T_{ha}$" in order to satisfy the breakdown performance for inverter driving.

Figure 7:
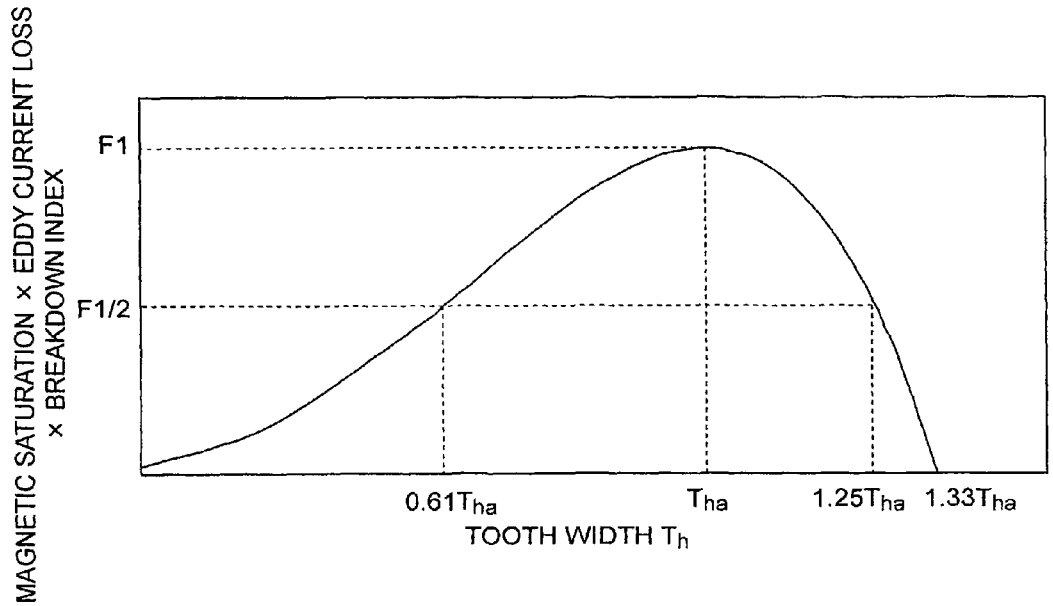
FIG. 7 is a graph showing a relationship between the tooth width and stator performance according to the first embodiment of the present invention.

FIG. 7 is an explanatory diagram showing the quartic function of Expression (6) in the form of a graph. The horizontal axis represents the tooth width $T_h$ of the base portion, and the vertical axis represents "magnetic saturation×eddy current loss (loss performance)×insulating performance".

In FIG. 7, the reference scale on the vertical axis is expressed by F1 (maximum value), and a permissible lower limit of permissible performance is set to F1/2.

It is understood from FIG. 7 that a comprehensive performance index (vertical axis) of the stator 10 including the insulating performance A, the magnetic saturation performance (magnetic flux density B), and the loss performance C can maintain a half or more of the maximum value F1 ($\geq$F1/2) when the tooth width $T_h$ falls within the range of $0.61T_{ha} < T_h < 1.25T_{ha}$.

Thus, in order to ensure the performance index of a half or more of the maximum value F1 ($\geq$F1/2), it is necessary to set the tooth width $T_h$ of the base portion of the stator 10 within the range of $0.61T_{ha} < T_h < 1.25T_{ha}$.

In addition, a larger tooth width $T_h$ is advantageous for magnetic saturation alleviation, and hence it is desired to upshift a permissible lower limit $T_{min}$ of the above-mentioned range from $0.61T_{ha}$ to $T_{ha}$ and set the tooth width $T_h$ within the range of $T_{ha} < T_h < 1.25T_{ha}$ defining only the upper limit side.

As described above, the stator for a rotating electric machine according to the first embodiment (FIGS. 1 to 7) of the present invention is the stator 10 that is to be arranged to be opposed to the rotor 20 having a different magnetic resistance depending on the rotational position thereof and is constructed to form the rotating electric machine 30 together with the rotor 20. The stator 10 includes the stator core 1, the teeth 2 and the slots 3 that are formed at equal pitches on the stator core 1 at portions opposed to the rotor 20, and the winding 4 wound around the tooth 2 so as to be arranged in the slot 3.

The teeth 2 are each formed to protrude toward the outer circumferential surface of the rotor 20 and each have a tapered shape in which the tooth width $T_h$ decreases toward the distal end portion.

The winding 4 is formed of an edgewise winding wound around the tooth 2 in a row, and is supplied with power so that the terminal 4a on the base portion side of the tooth 2 may have a higher voltage than that of the terminal 4b on the distal end portion side of the tooth 2.

The tooth width $T_h$ of the base portion of the tooth 2 is set within the range of $T_{min} < T_h < 1.25T_{ha}$, which is defined by the tooth width $T_{ha}$ that maximizes the value of Expression (6) expressing the index F ($T_h$) of the insulating performance A, the loss performance C, and the magnetic saturation performance (magnetic flux density B) with use of the outer radius D and the core back width $T_C$ of the stator core 1, the winding width h, the air gap a between the tooth 2 and the winding 4, the pitch α of the tooth 2 and the slot 3, and the inclination angle β of the winding 4, and the permissible lower limit $T_{min}$.

In this manner, the high voltage side of the winding 4 is set on the core back side of the stator 10 while the low voltage side thereof is set to the distal end portion of the tooth 2, and the electrical clearance between the windings 4 is set to be larger on the core back side of the stator 10 and be smaller on the distal end side of the tooth 2, to thereby form the tooth 2 into the tapered shape. Consequently, the magnetic saturation of the base portion of the tooth 2 can be alleviated to reduce the iron loss, and the insulating performance can be satisfied.

Specifically, according to the first embodiment of the present invention, the phase-to-phase electrical clearance in a region where insulation in the slot 3 is difficult to establish can be ensured, and a wider distal end portion of the tooth 2 than the related-art structure can be ensured. Consequently, output torque of the rotating electric machine 30 (motor) can be improved.

Further, an insulating material such as varnish can be filled into the clearance δ ensured to be wide, and hence the insulating performance can be further improved, and the heat to be generated in the winding 4 of the stator 10 can be easily transferred to the core back portion of the stator core 1 so that the winding 4 can be effectively cooled.

Further, by setting the permissible lower limit $T_{min}$ to be 0.61 times as large as the tooth width $T_{ha}$ that maximizes the value of Expression (6), the above-mentioned performance of the stator 10 can be sufficiently satisfied.

Further, by setting the permissible lower limit $T_{min}$ to the tooth width $T_{ha}$ that maximizes the value of Expression (6), the magnetic saturation of the stator core 1 including the teeth 2 can be further alleviated to reduce the iron loss of the stator 10.

In addition, the number of parallel connections of the windings 4 (FIG. 3) is set to a value equal to a greatest common divisor P (=10) of the number of poles of the rotor 20 (=20) and the number of slots of the stator 10 (=30). Consequently, the air gap at the base portion of the tooth 2 can be widened, and the insulating performance can be sufficiently satisfied even under the severest conditions for insulating performance.

Second Embodiment

Note that, in the above-mentioned first embodiment (FIG. 3), the ten three-phase motor windings 4 are all connected in parallel for each of the U-phase, the V-phase, and the W-phase. Alternatively, however, as illustrated in FIG. 8, ten windings 4 for each phase may be connected in series for two teeth and in parallel for five teeth.

Figure 8:
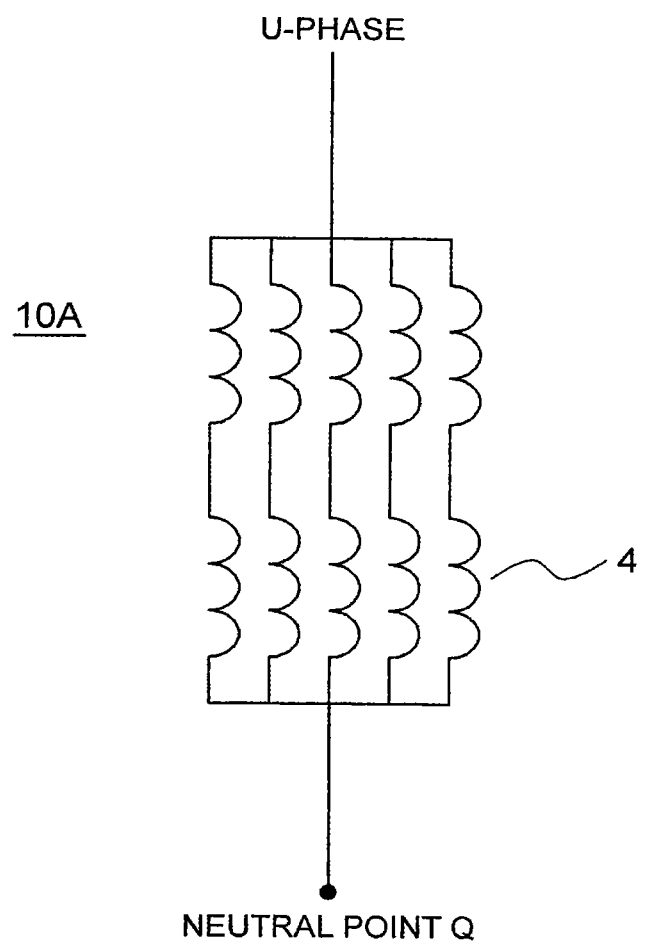
FIG. 8 is an explanatory diagram illustrating a connection state of a winding according to a second embodiment of the present invention.

FIG. 8 is an explanatory diagram illustrating a connection state of windings 4 of a stator 10A according to a second embodiment of the present invention, and illustrates only representative ten windings 4 for the U-phase. Note that, the configuration omitted in FIG. 8 is as illustrated in FIGS. 1 and 2.

It should be understood that the same functions and effects as those described above are obtained even by the connection state of FIG. 8.

Third Embodiment

Further, in the above-mentioned first embodiment (FIG. 1), the ratio between the number of poles of the magnets 6 (20) and the number of the slots 3 (30) is set to 20:30 (=2:3). Alternatively, however, as illustrated in FIG. 9, the number of poles of the magnets 6 may be 40, and the ratio between the number of poles (40) and the number of the slots 3 (30) may be set to 40:30 (=4:3).

Figure 9:
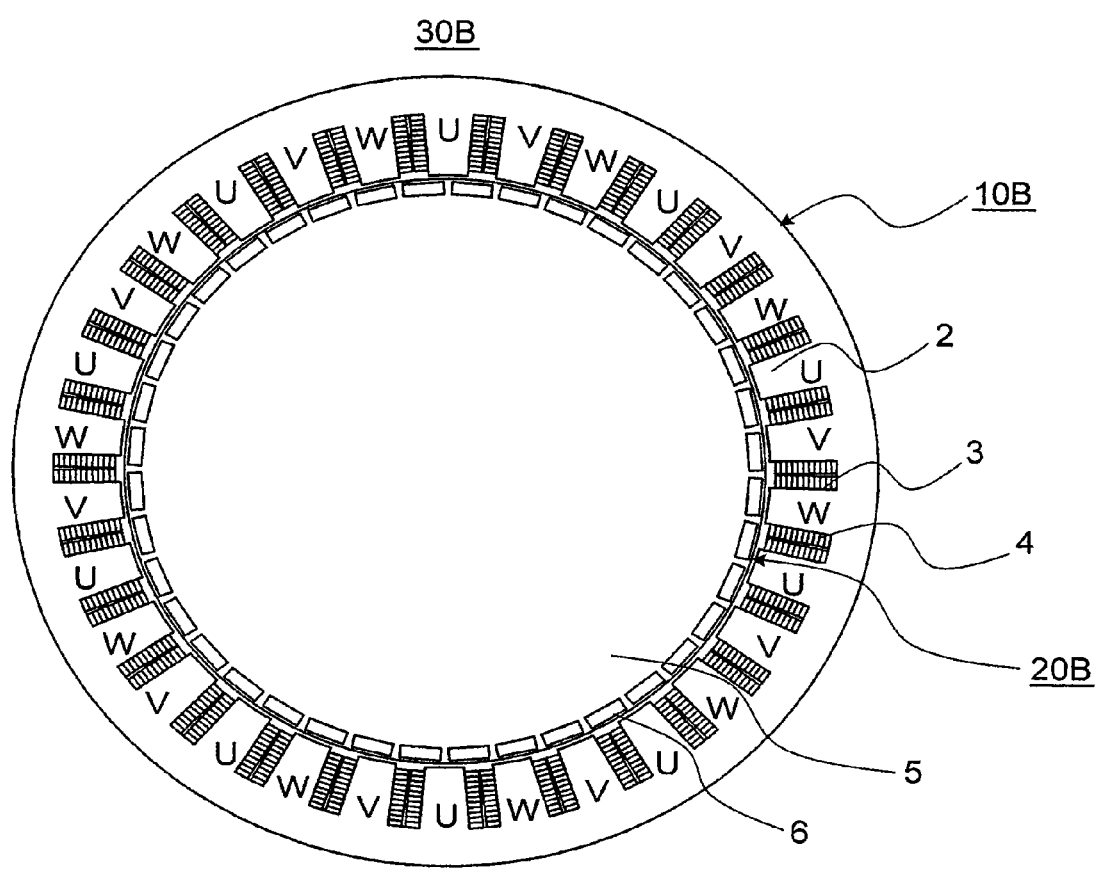
FIG. 9 is a cross-sectional diagram illustrating a stator as well as a rotor of a rotating electric machine according to a third embodiment of the present invention.

FIG. 9 is a cross-sectional diagram illustrating a stator as well as a rotor for a rotating electric machine according to a third embodiment of the present invention. The same parts as those described above (see FIG. 1) are denoted by the same reference symbols as those described above, or denoted by reference symbols suffixed with "B" to omit detailed descriptions thereof.

In FIG. 9, a rotating electric machine 30B includes a stator 10B including thirty teeth 2 and windings 4 and a rotor 20B including forty magnets 6.

Note that, in the case of the 4:3 system using forty magnets 6 and thirty slots 3 as illustrated in FIG. 9, it is necessary to construct the opposite connection state of the respective windings 4 of the V-phase and the W-phase as compared to the case of the above-mentioned 2:3 system (FIG. 1).

Thus, in FIG. 9, the respective windings 4 of the stator 10B are wound around the respective teeth 2 in the clockwise direction in the order of the U-phase, the V-phase, and the W-phase.

It should be understood that the same functions and effects as those described above are obtained also in the case where the present invention is applied to the rotating electric machine 30B having the 4:3 system of FIG. 9.

Specifically, the windings 4 of each phase are connected in parallel as described above (FIG. 3), and the number of parallel connections of the windings 4 is set to be a value (=10) equal to a greatest common divisor P (=10) of the number of poles of the rotor 20 (=40) and the number of slots of the stator 10 (=30). Consequently, the air gap at the base portion of the tooth 2 can be widened, and the insulating performance can be sufficiently satisfied even under the severest conditions for insulating performance.

Fourth Embodiment

Note that, in the above-mentioned first embodiment (FIGS. 1 to 5), the cross-sectional shape of each tooth 2 is the tapered shape as a whole. Alternatively, however, as illustrated in FIG. 10, a base portion 2Ca of a tooth 2C may be formed into a straight shape, and only a distal end portion 2Cb thereof may be formed into a tapered shape.

Figure 10:
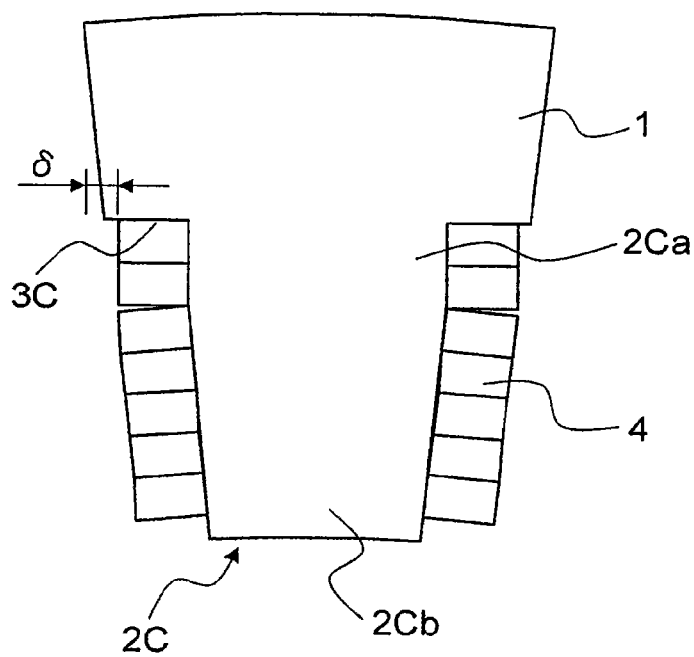
FIG. 10 is an enlarged cross-sectional diagram of a single tooth shape of a stator of a rotating electric machine according to a fourth embodiment of the present invention.
Figure 11:
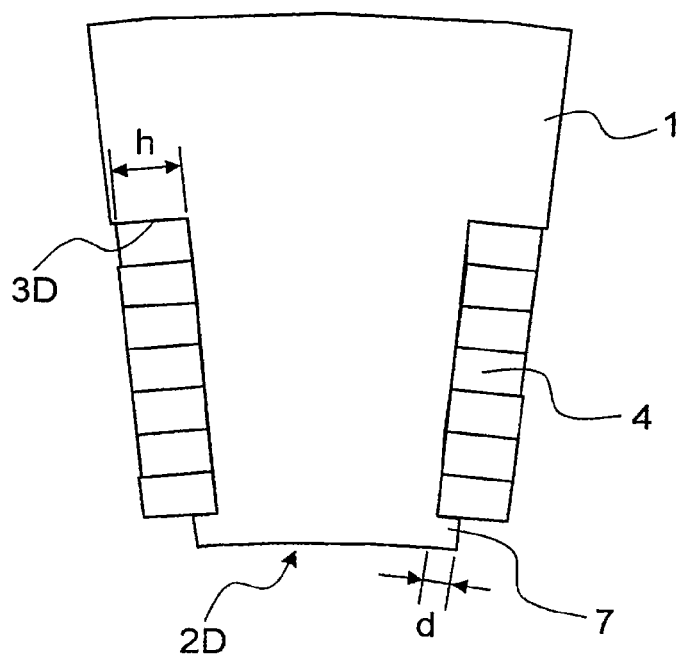
FIG. 11 is an enlarged cross-sectional diagram of a single tooth shape of a stator of a rotating electric machine according to a fifth embodiment of the present invention.

FIG. 10 is an enlarged cross-sectional diagram of the shape of a single tooth 2C of a stator 100 according to a fourth embodiment of the present invention. The same parts as those described above are denoted by the same reference symbols as those described above, or denoted by reference symbols suffixed with "C" to omit detailed descriptions thereof. Note that, the configuration omitted in FIG. 11 is the same as described above.

In FIG. 10, the distal end portion 2Cb of the tooth 2C has a tapered shape in which the width thereof decreases toward the outer circumferential surface of the rotor 20 (not shown), but the base portion 2Ca of the tooth 2C has a straight shape.

It should be understood that the same functions and effects as those described above are obtained even in the case of the tooth 2C having the cross-sectional shape of FIG. 10.

Further, by forming the base portion 2Ca into the straight cross-sectional shape, the clearance δ between adjacent windings 4 can be maintained at the base portion 2Ca of the tooth 2C.

In addition, the windings 4 can be wound around the base portion 2Ca more easily in the case of the straight shape than in the case of the tapered shape, and hence the manufacture of the stator 100 is facilitated.

Fifth Embodiment

Note that, in the above-mentioned first to fourth embodiments, no description is given of a specific shape of the tooth distal end portion, but as illustrated in FIG. 11, a flange 7 may be formed at a distal end of a tooth 2D of a stator 10D.

FIG. 11 is an enlarged cross-sectional diagram of the shape of a single tooth 2C of a stator 100 according to a fifth embodiment of the present invention. The same parts as those described above are denoted by the same reference symbols as those described above, or denoted by reference symbols suffixed with "C" to omit detailed descriptions thereof. Note that, the configuration omitted in FIG. 11 is the same as described above.

In FIG. 11, the flange 7 is formed at the distal end of the tooth 2D.

Note that, it is preferred that a length d of the flange 7 be smaller than the winding width h.

If the length d of the flange 7 is larger than the winding width h, the distal end portions of adjacent teeth 2D become too close to each other, and hence the magnitude of leakage magnetic flux may increase to reduce the torque output of the rotating electric machine.

It should be understood that the same functions and effects as those described above are obtained even in the case of the tooth 2D including the flange 7 formed at its distal end portion as illustrated in FIG. 11.

Further, the flange 7 functions as a guide to be used for winding the winding 4 around the distal end portion of the tooth 2D, and hence the manufacture of the stator 10C is facilitated.

Sixth Embodiment

In the above-mentioned first to fifth embodiments, the case where the ratio of the number of poles of the magnets 6 and the number of the slots 3 is set to 20:30 (=2:3) or 40:30 (=4:3) has been exemplified. In a sixth embodiment of the present invention, on the other hand, the case where the number of poles of the magnets 6 is 20 and the number of the slots is 24 so as to set the ratio of the number of poles of the magnets 6 (20) and the number of the slots 3 (24) to 20:24 (=10:12) is exemplified.

Figure 12:
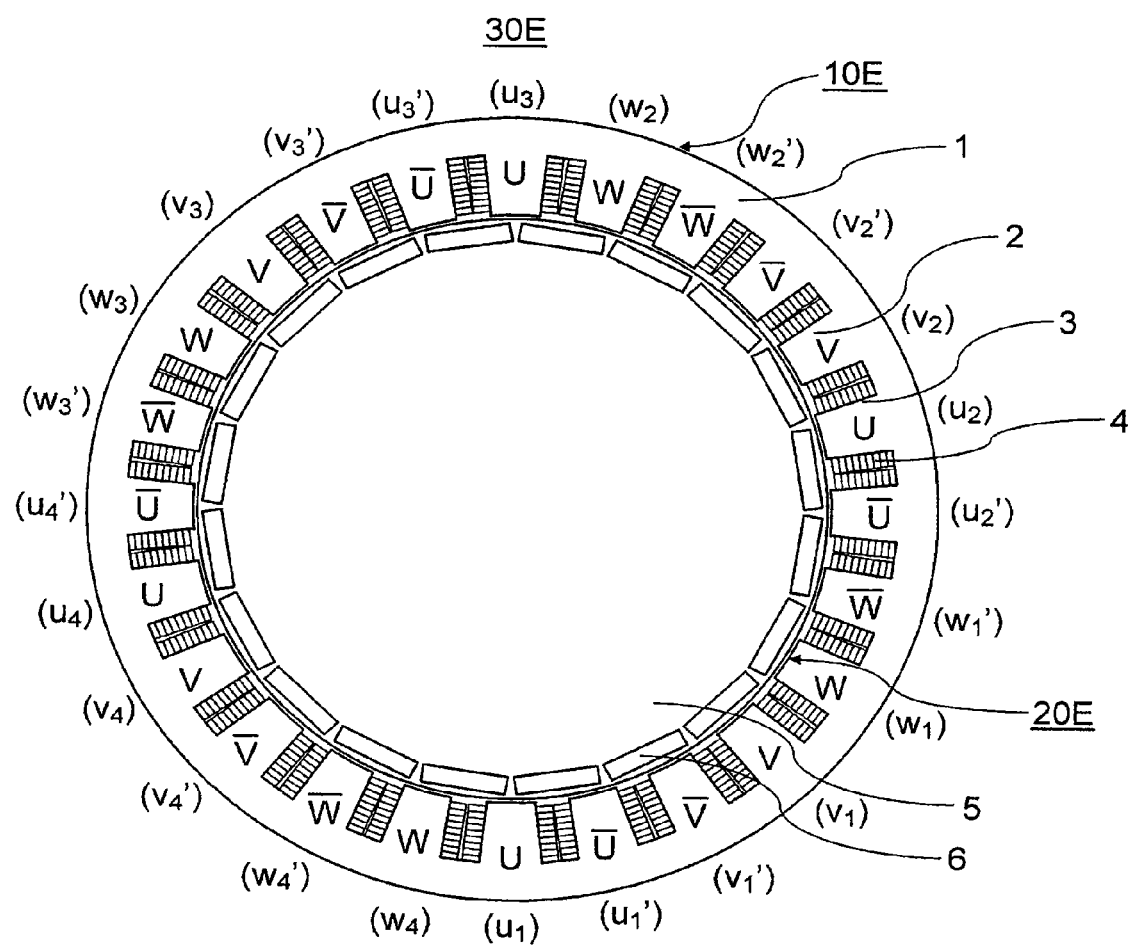
FIG. 12 is a cross-sectional diagram illustrating a stator as well as a rotor of a rotating electric machine according to a sixth embodiment of the present invention.

FIG. 12 is a cross-sectional diagram illustrating a stator as well as a rotor for a rotating electric machine according to the sixth embodiment of the present invention. The same parts as those described above (see FIG. 1) are denoted by the same reference symbols as those described above, or denoted by reference symbols suffixed with "E" to omit detailed descriptions thereof.

In FIG. 12, a rotating electric machine 30E includes a stator 10E including twenty-four teeth 2 and windings 4 and a rotor 20E including twenty magnets 6. Further, in FIG. 12, the teeth 2 form, together with the windings 4 wound around the respective teeth 2, for example, a U-phase coil unit including four U-phase coils and four U (bar)-phase coils, a V-phase coil unit including four V-phase coils and four V (bar)-phase coils, and a W-phase coil unit including four W-phase coils and four W (bar)-phase coils.

Specifically, as illustrated in FIG. 12, the U-phase coil unit includes a first U-phase coil $u_1$ to a fourth U-phase coil $u_4$ and a first U (bar)-phase coil $u_1'$ to a fourth U (bar)-phase coil $u_4'$, the V-phase coil unit includes a first V-phase coil $v_1$ to a fourth V-phase coil $v_4$ and a first V (bar)-phase coil $v_1'$ to a fourth V (bar)-phase coil $v_4'$, and the W-phase coil unit includes a first W-phase coil $w_1$ to a fourth W-phase coil $w_4$ and a first W (bar)-phase coil $w_1'$ to a fourth W (bar)-phase coil $w_4'$. In this case, the windings 4 are wound around the respective teeth 2 in the counterclockwise direction in the order of the U-phase, the V-phase, and the W-phase.

Note that, in the U-phase coil and the U (bar)-phase coil illustrated in FIG. 12, the windings 4 are wound around the respective teeth 2 so that the directions of magnetic fluxes thereof may be opposite to each other. The same holds true for the V-phase coil and the V (bar)-phase coil and for the W-phase coil and the W (bar)-phase coil.

Figure 13:
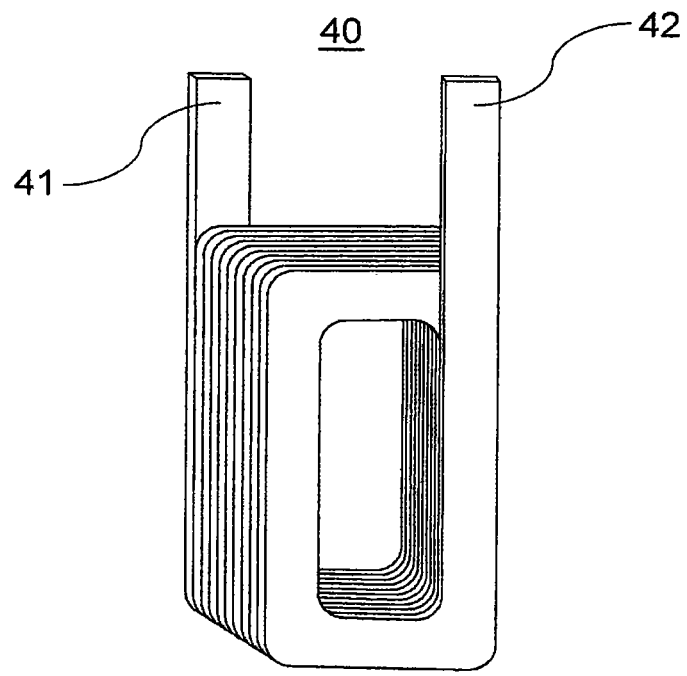
FIG. 13 is an explanatory diagram illustrating a right-handed coil to be provided to the stator according to the sixth embodiment of the present invention.
Figure 14:
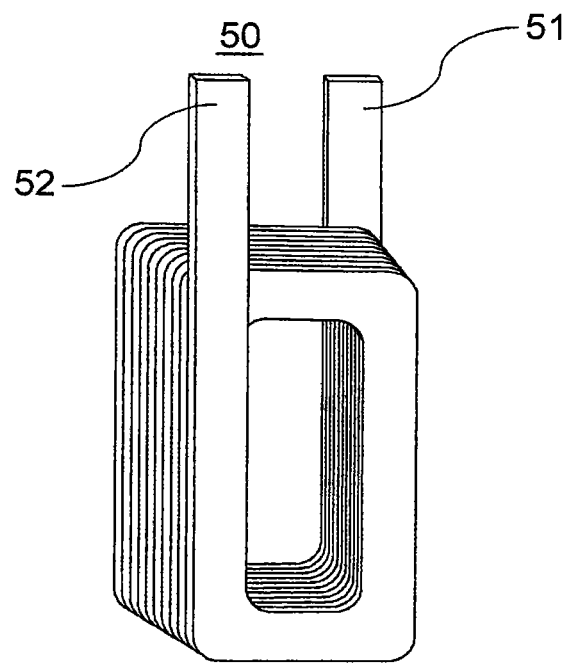
FIG. 14 is an explanatory diagram illustrating a left-handed coil to be provided to the stator according to the sixth embodiment of the present invention.

FIG. 13 is an explanatory diagram illustrating a right-handed coil 40 to be provided in the stator 10E according to the sixth embodiment of the present invention. FIG. 14 is an explanatory diagram illustrating a left-handed coil 50 to be provided in the stator 10E according to the sixth embodiment of the present invention. Note that, the following description focuses on the configurations of the U-phase coil and the U (bar)-phase coil.

As described above, in the adjacent U-phase coil and U (bar)-phase coil, the winding direction of the winding 4 in the U-phase coil and the winding direction of the winding 4 in the U (bar)-phase coil are opposite to each other so that the directions of magnetic fluxes thereof may be opposite to each other.

Specifically, in the case where the winding 4 is wound around the tooth 2 in one direction (for example, the right-handed direction), the right-handed coil 40 is constructed as the U-phase coil as illustrated in FIG. 13. On the other hand, in the case where the winding 4 is wound around the tooth 2 in an opposite direction (for example, the left-handed direction), the left-handed coil 50 is constructed as the U (bar)-phase coil as illustrated in FIG. 14.

Note that, in the coils 40 and 50 illustrated in FIGS. 13 and 14, base side coil ends 41 and 51 on the back side (on the back side in FIGS. 13 and 14) each correspond to the terminal 4a at the base portion of the tooth 2, and distal end side coil ends 42 and 52 on the front side (on the front side in FIGS. 13 and 14) each correspond to the terminal 4b at the distal end portion of the tooth 2.

Now, for example, it is assumed that, in the first U-phase coil $u_1$ and the first U (bar)-phase coil $u_1'$ among the coils of the U-phase coil unit, the base side coil end 41 of the first U-phase coil $u_1$ (right-handed coil 40) is supplied with power from the inverter (high voltage side). In this case, the distal end side coil end 42 of the first U-phase coil $u_1$ is connected to the base side coil end 51 of the first U (bar)-phase coil $u_1'$ (left-handed coil 50). Further, the distal end side coil end 52 of the first U (bar)-phase coil $u_1'$ is connected to the neutral point Q (low voltage side).

On the other hand, in the first V-phase coil $v_1$ and the first V (bar)-phase coil $v_1'$ among the coils of the V-phase coil unit, the base side coil end 51 of the first V (bar)-phase coil $v_1'$ (left-handed coil 50) is connected to the inverter (high voltage side). Further, the distal end side coil end 52 of the first V (bar)-phase coil $v_1'$ is connected to the base side coil end 41 of the first V-phase coil $v_1$ (right-handed coil 40). Further, the distal end side coil end 42 of the first V-phase coil $v_1$ is connected to the neutral point Q (low voltage side). Note that, the first U (bar)-phase coil $u_1'$ and the first V (bar)-phase coil $v_1'$ are formed on adjacent teeth 2.

In addition, in the first W-phase coil $w_1$ and the first W (bar)-phase coil $w_1'$ among the coils of the W-phase coil unit, the base side coil end 41 of the first W-phase coil $w_1$ (right-handed coil 40) is connected to the inverter (high voltage side). Further, the distal end side coil end 42 of the first W-phase coil $w_1$ is connected to the base side coil end 51 of the first W (bar)-phase coil $w_1'$ (left-handed coil 50). In addition, the distal end side coil end 52 of the first W (bar)-phase coil $w_1'$ is connected to the neutral point Q (low voltage side). Note that, the first V-phase coil $v_1$ and the first W-phase coil $w_1$ are formed on adjacent teeth 2.

In this manner, the coils connected to the inverter (high voltage side) and the coils connected to the neutral point Q (low voltage side) are alternately arranged in the stator 10E. Specifically, as illustrated in FIG. 12, the base side coil ends 41 and 51 of the first U-phase coil $u_1$, the first V (bar)-phase coil $v_1'$, the first W-phase coil $w_1$, the second U (bar)-phase coil $u_2'$, the second V-phase coil $v_2$, the second W (bar)-phase coil $w_2'$. are connected to the inverter (high voltage side). Further, the distal end side coil ends 42 and 52 of the first U (bar)-phase coil $u_1'$, the first V-phase coil $v_1$, the first W (bar)-phase coil $w_1'$, the second U-phase coil $u_2$, the second V (bar)-phase coil $v_2'$, the second W-phase coil $w_2$ . . . are connected to the neutral point Q (low voltage side).

Figure 15:
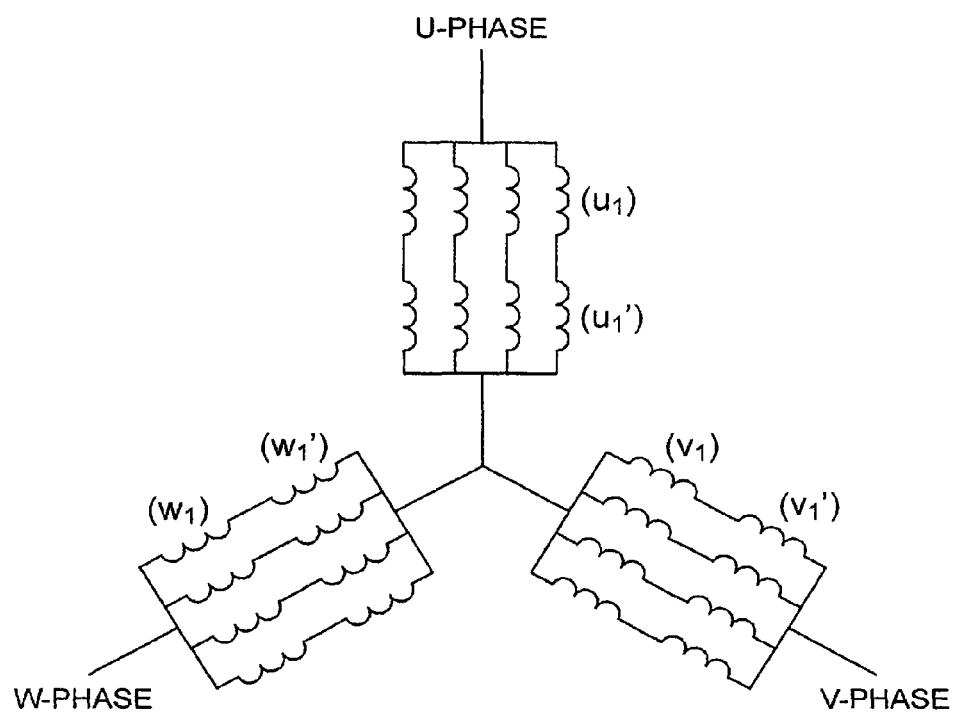
FIG. 15 is an explanatory diagram illustrating a connection state of respective windings of the stator according to the sixth embodiment of the present invention.

FIG. 15 is an explanatory diagram illustrating a connection state of the respective windings 4 of the stator 10E according to the sixth embodiment of the present invention. In FIG. 15, among the coils of the U-phase coil unit, the U-phase coil (right-handed coil 40) and the U (bar)-phase coil (left-handed coil 50) that are provided adjacent to each other in the stator 10E are connected in series. Specifically, the first U-phase coil $u_1$ and the first U (bar)-phase coil $u_1'$ illustrated in FIG. 12 are connected in series, and similarly, the second U-phase coil $u_2$ to the fourth U-phase coil $u_4$ and the second U (bar)-phase coil $u_2'$ to the fourth U (bar)-phase coil $u_4'$ are connected in series, respectively.

Further, four sets of the U-phase coils and the U (bar)-phase coils connected in series are connected in parallel. Specifically, the number of parallel connections is set to a greatest common divisor P (=4) of the number of poles of the magnets 6 (=20) and the number of the slots 3 (=24). Further, the V-phase coil unit and the W-phase coil unit also have the same connection state as that of the U-phase coil unit.

Note that, in each phase coil unit, the right-handed coil 40 and the left-handed coil 50 that are provided adjacent to each other in the stator 10E can be connected in parallel in principle, but it is preferred to connect the right-handed coil 40 and the left-handed coil 50 in series as described above.

Figure 16:
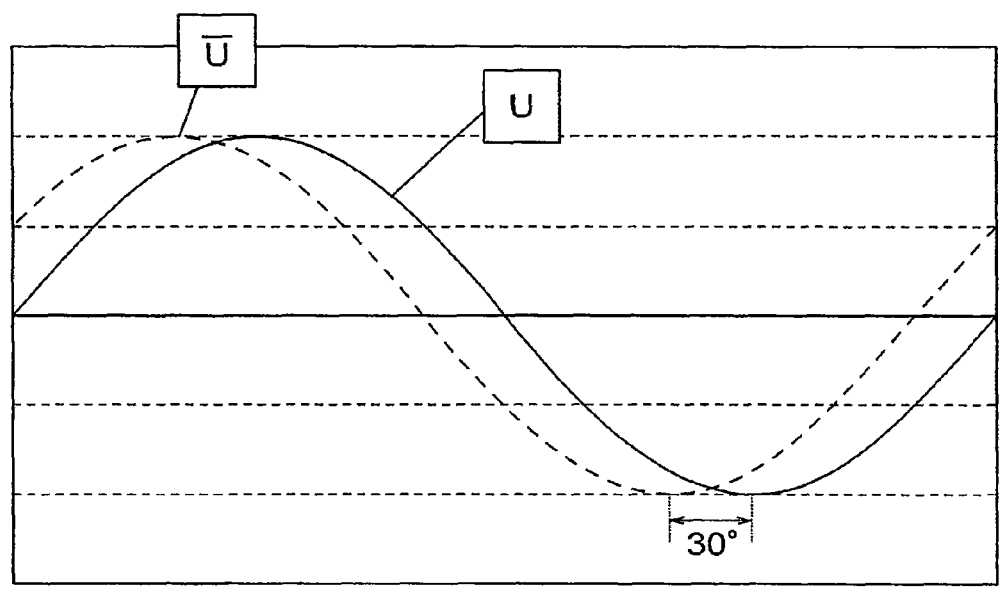
FIG. 16 is a graph showing induced voltages generated in a U-phase coil and a U (bar)-phase coil provided adjacent to each other in the stator according to the sixth embodiment of the present invention.

FIG. 16 is a graph showing respective induced voltages generated in the U-phase coil and the U (bar)-phase coil that are provided adjacent to each other in the stator 10E according to the sixth embodiment of the present invention. As shown in FIG. 16, the phase of the induced voltage generated in the U-phase coil and the phase of the induced voltage generated in the U (bar)-phase coil are shifted from each other by 30 degrees. Thus, in order to prevent a circulating current, it is preferred that the right-handed coil 40 and the left-handed coil 50, which are provided adjacent to each other in the stator 10E, be connected in series in each phase coil unit.

Figure 17:
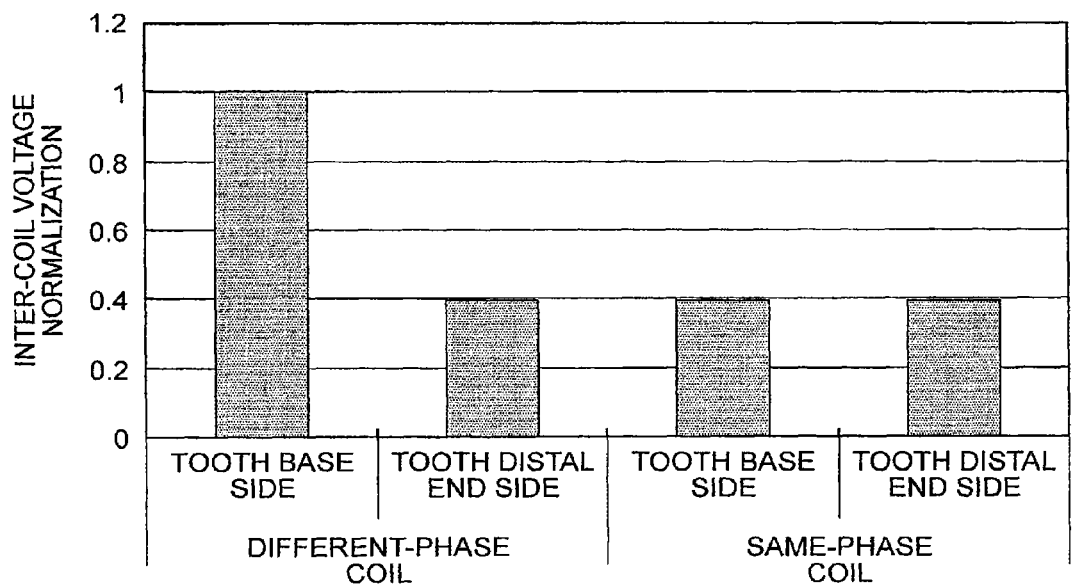
FIG. 17 is a graph showing potential differences (inter-coil voltages) generated between coils that are provided adjacent to each other in the stator according to the sixth embodiment of the present invention.

FIG. 17 is a graph showing potential differences (inter-coil voltages) generated between coils that are provided adjacent to each other in the stator 10E according to the sixth embodiment of the present invention.

FIG. 17 shows a potential difference generated between different-phase coils together with a potential difference generated between same-phase coils. Note that, the different-phase coils mean coils of different phases, such as the U-phase coil and the V-phase coil, and the same-phase coils mean coils of the same phase, such as the U-phase coil and the U (bar)-phase coil.

Further, FIG. 17 shows, as a specific example, the potential difference generated between the base side coil ends 51 of the first U (bar)-phase coil $u_1'$ and the first V (bar)-phase coil $v_1'$ and the potential difference generated between the distal end side coil ends 52 thereof. In this case, the first U (bar)-phase coil $u_1'$ is the low voltage side coil, and the first V (bar)-phase coil $v_1'$ is the high voltage side coil, and hence the high voltage side coil and the low voltage side coil are always arranged to be adjacent to each other between different phases. FIG. 17 also shows the potential difference generated between the base side coil ends 41 and 51 of the first U-phase coil $u_1$ and the first U (bar)-phase coil $u_1'$ and the potential difference generated between the distal end side coil ends 42 and 52 thereof. Note that, the respective potential differences shown in FIG. 17 are normalized to the value of the potential difference generated between the base side coil ends 41 of the first U (bar)-phase coil $u_1'$ and the first V (bar)-phase coil $v_1'$ as a reference.

As shown in FIG. 17, in regard to the potential difference generated between different-phase coils, it can be confirmed that the potential difference generated between the base side coil ends (tooth base side) of the different-phase coils is larger than the potential difference generated between the distal end side coil ends (tooth distal end side) thereof. Further, in regard to the potential difference generated between the same-phase coils, it can be confirmed that the potential difference generated between the base side coil ends (tooth base side) of the same-phase coils is equal to the potential difference generated between the distal end side coil ends (tooth distal end side) thereof.

As described above, the potential difference (inter-coil voltage) generated between coils that are provided adjacent to each other (adjacent coils) in the stator 10E is larger on the base side of the tooth 2 than on the distal end side of the tooth 2 or equal therebetween. Consequently, similarly to the above-mentioned first embodiment, the same effects are obtained by increasing the inter-coil clearance on the base side of the tooth 2 to be larger than the inter-coil clearance on the distal end side of the tooth 2.

Seventh Embodiment

Note that, in the above-mentioned sixth embodiment (FIGS. 12 to 14), the coil is constructed so that one winding 4 is wound around one tooth 2. Alternatively, however, the same effects are obtained even by a coil configuration as illustrated in FIG. 18 in which one winding 4 is wound around two teeth 2.

Figure 18:
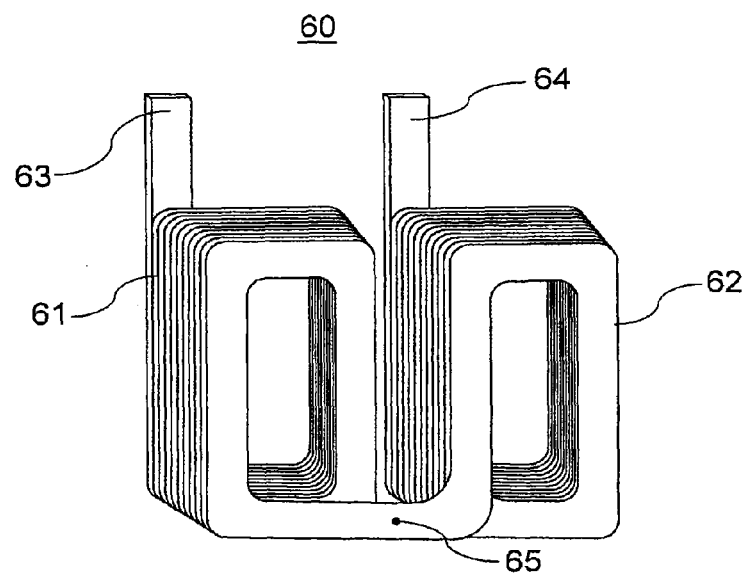
FIG. 18 is an explanatory diagram illustrating coils that are provided adjacent to each other in a stator according to a seventh embodiment of the present invention.

FIG. 18 is an explanatory diagram illustrating coils 60 that are provided adjacent to each other in a stator 10F according to a seventh embodiment of the present invention. Specifically, in the above-mentioned sixth embodiment, one winding 4 is wound around one of two adjacent teeth 2 in the clockwise direction, and another winding 4 is wound around the other tooth 2 in the counterclockwise direction, to thereby form the same-phase coils (right-handed coil 40 and left-handed coil 50). In the seventh embodiment, on the other hand, one winding 4 is continuously wound around two adjacent teeth while inverting the winding direction (right-handed or left-handed), to thereby form the single coil 60 as the same-phase coil.

Note that, in the coil 60 illustrated in FIG. 18, a right-handed winding portion (left side in FIG. 18) is referred to as "first winding portion 61", and a left-handed winding portion (right side in FIG. 18) is referred to as "second winding portion 62". Further, the first winding portion 61 corresponds to the U-phase coil, the V-phase coil, and the W-phase coil (right-handed coil 40) in the above-mentioned sixth embodiment, and the second winding portion 62 corresponds to the U (bar)-phase coil, the V (bar)-phase coil, and the W (bar)-phase coil (left-handed coil 50) in the above-mentioned sixth embodiment.

Further, a base side coil end 63 located on the back side of the first winding portion 61 corresponds to the base side coil end 41 in the above-mentioned sixth embodiment, and a base side coil end 64 located on the back side of the second winding portion 62 corresponds to the base side coil end 51 in the above-mentioned sixth embodiment.

Further, a coil center portion 65 between the first winding portion 61 and the second winding portion 62 corresponds to the distal end side coil ends 42 and 52 in the above-mentioned sixth embodiment.

Further, power is fed to the coil 60 from the inverter in a manner that the base side coil end 63 of the first winding portion 61 is connected to the inverter and the base side coil end 64 of the second winding portion 62 is connected to the neutral point Q.

Figure 19:
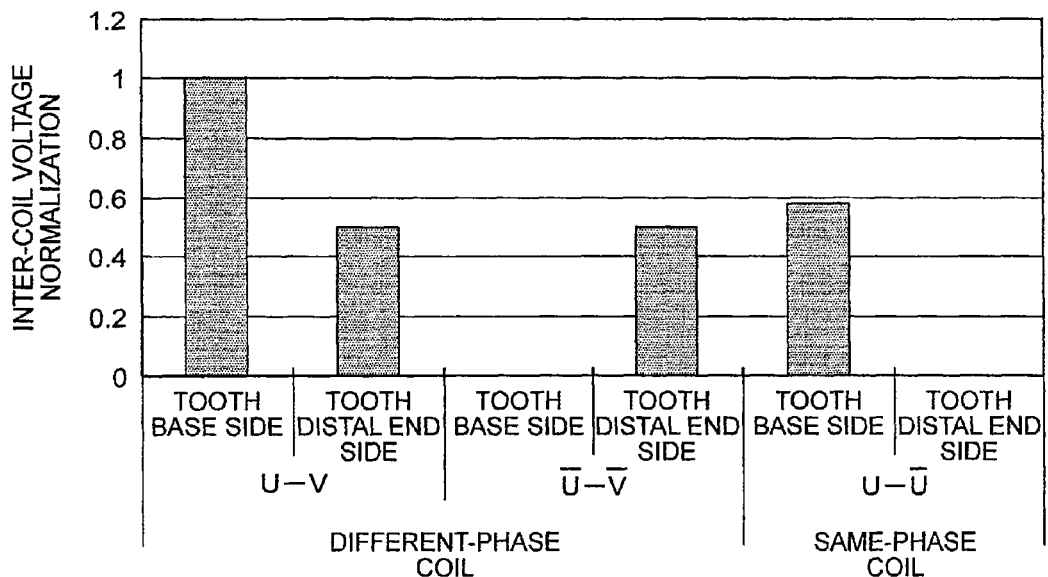
FIG. 19 is a graph showing potential differences (inter-coil voltages) generated between coils that are provided adjacent to each other in the stator according to the seventh embodiment of the present invention.

FIG. 19 is a graph showing potential differences (inter-coil voltages) generated between coils that are provided adjacent to each other in the stator 10F according to the seventh embodiment of the present invention.

Similarly to FIG. 17 referred to above, FIG. 19 shows a potential difference generated between different-phase coils together with a potential difference generated between same-phase coils. As shown in FIG. 19, in regard to the potential difference generated between the same-phase coils, it can be confirmed that the potential difference generated between the base side coil ends (tooth base side) of the same-phase coils is larger than the potential difference generated between the distal end side coil ends (tooth distal end side) thereof.

Further, as shown in FIG. 19, in regard to the potential difference generated between the different-phase coils, the potential difference generated between the base side coil ends (tooth base side) is larger in some cases and smaller in other cases than the potential difference generated between the distal end side coil ends (tooth distal end side). Specifically, for example, the potential difference between the base side coil end 63 of the first winding portion 61 corresponding to the U-phase coil and the base side coil end 61 of the first winding portion 61 corresponding to the V-phase coil is larger than the potential difference between the coil center portion 65 of the first winding portion 61 corresponding to the U-phase coil and the coil center portion 65 of the first winding portion 61 corresponding to the V-phase coil.

In contrast, for example, the potential difference between the base side coil end 64 of the second winding portion 62 corresponding to the U (bar)-phase coil and the base side coil end 64 of the second winding portion 62 corresponding to the V (bar)-phase coil is smaller than the potential difference between the coil center portion 65 of the second winding portion 62 corresponding to the U (bar)-phase coil and the coil center portion of the second winding portion 62 corresponding to the V (bar)-phase coil. Note that, in this case, it is preferred to further increase the inter-coil clearance on the distal end side of the teeth 2 on which the second winding portions 62 are formed.

Eighth Embodiment

Figure 20:
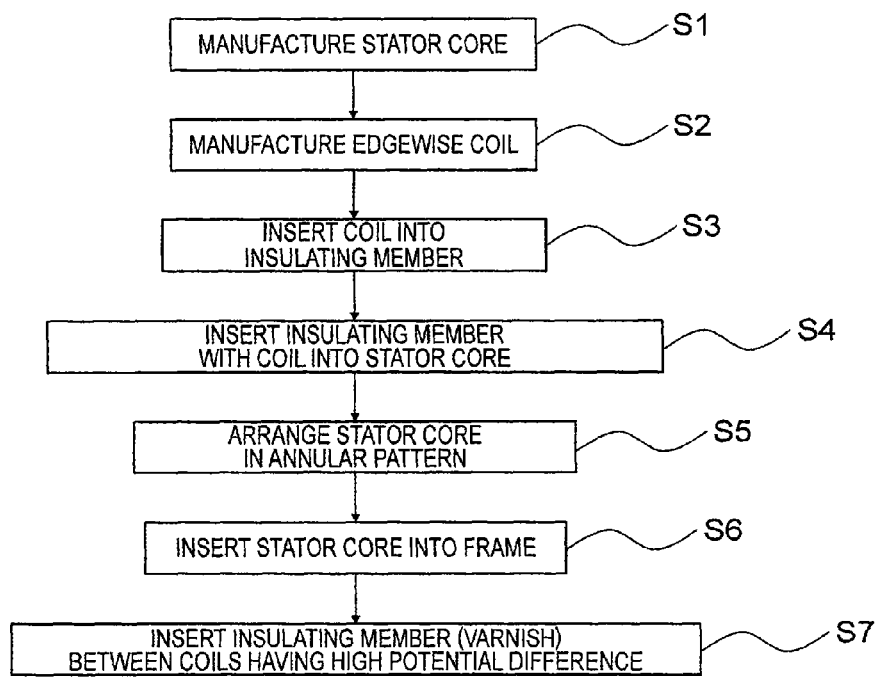
FIG. 20 is a flowchart illustrating a method of manufacturing a stator of a rotating electric machine according to the first to seventh embodiments of the present invention.

FIG. 20 is a flowchart illustrating a method of manufacturing the stator for a rotating electric machine according to the first to seventh embodiments of the present invention. Note that, in an eighth embodiment of the present invention, a description is given of the case where the teeth 2 are divided for each tooth. In this case, the method of manufacturing the stator for a rotating electric machine according to the eighth embodiment has a technical feature in that the method includes Step S1 of forming the stator core 1 so that the teeth 2, each of which has a tapered shape in which the tooth width decreases towards the distal end portion thereof, may be formed to protrude from an inner circumferential portion of the stator core 1 at equal pitches, and Step S7 of inserting an insulating member from a clearance between coils of the stator core 1.

First, in Step S1, the stator core is manufactured so that the teeth 2, each of which has a tapered shape in which the tooth width decreases toward the distal end portion thereof, may be formed to protrude from the inner circumferential portion of the stator core at equal pitches, and then the flow proceeds to Step S2. Note that, various dimensions of a single tooth in this case are set to the above-mentioned dimensions. By forming the stator core 1 into the shape as in Step S1, the clearance can be formed between the coils of the stator core 1 in Step S7 to be described later.

Next, in Step S2, a coil to be used for the stator for a rotating electric machine is manufactured. Specifically, edgewise windings are used to manufacture the coil illustrated in FIG. 13, 14, or 18, and then the flow proceeds to Step S3. Subsequently, in Step S3, the coil manufactured in Step S2 is inserted into an insulating member (insulator) in order to insulate the coil from the stator core manufactured in Step S1. Then, the flow proceeds to Step S4.

Next, in Step S4, the insulating member having the coil inserted therein in Step S3 is inserted into the stator core, and then the flow proceeds to Step S5. Subsequently, in Step S5, the stator core having the insulating member inserted therein in Step S4 is arranged in an annular pattern, and then the flow proceeds to Step S6.

Next, in Step S6, the stator core arranged in the annular pattern in Step S5 is fitted into a frame, and then the flow proceeds to Step S7. Note that, in Step S6, the stator core may be fitted into the frame by, for example, press-fitting or shrink-fitting. In this manner, Step S4, Step S5, and Step S6 are executed to form a stator iron core having an annular pattern as illustrated in FIG. 1 or 12.

Next, in Step S7, an insulating member such as varnish is inserted (injected) in order to fix each coil of the stator core fitted into the frame in Step S6. Specifically, the insulating member is inserted from a region where the clearance between the coils of the stator core is wide, to thereby fix the coil. Note that, a description is omitted for a step of connecting the fixed coils to be performed after the execution of Step S7 according to the eighth embodiment.

In this case, the stator for a rotating electric machine according to the above-mentioned first to seventh embodiments is constructed so as to increase the clearance between coils corresponding to the region where the potential difference is large as described above. Thus, in Step S7, varnish or the like is inserted from the region where the clearance between coils is wide, to thereby fix the coil. In this case, the varnish also has the function as the insulating member, and hence the dielectric voltage between coils can be enhanced as described above. In addition, by using varnish having a higher thermal conductivity than that of space, heat to be generated in the coil can be easily transferred to the stator iron core (core back side), and hence the temperature of the coil can be effectively decreased. In this manner, according to the present invention, the stator for a rotating electric machine, which is capable of further improving the insulating performance and suppressing heat generation of the coil as compared to the related art, can be obtained.

Note that, in the above-mentioned first to fifth embodiments, a description has been given of the systems in which the ratio of the number of poles of the magnets 6 and the number of slots is 2:3 and 4:3, and in the above-mentioned sixth and seventh embodiments, a description has been given of the system in which the ratio is 10:12. Alternatively, however, the present invention is also applicable to another ratio of the number of poles and the number of slots. For example, even in the case of a (9±1):9 system and a (12±2):12 system, the same functions and effects as those described above are obtained.

Further, in the above-mentioned first to seventh embodiments, no particular description has been given of the thickness of the insulating member (not shown) interposed between the stator core 1 and the winding 4 and between the tooth 2 and the winding 4. The insulating member may be thin on the low voltage side, and hence the insulating member may be formed so as to be thinner from the base portion (high voltage side) of the tooth 2 toward the distal end portion (low voltage side) thereof.

In this manner, by setting the thickness of the insulating member to be smaller from the high voltage side to the low voltage side, the thickness of the insulating member can be variably set in accordance with the dielectric voltage. Consequently, the tooth width $T_h$ can be set to be as large as possible, and hence the iron loss can be further reduced.

The invention claimed is:

1. A stator for a rotating electric machine, which is to be arranged to be opposed to a rotor, the rotor having a different magnetic resistance depending on a rotational position thereof, the stator being configured to construct a rotating electric machine together with the rotor, the stator comprising:

a stator core;

teeth and slots, which are formed at equal pitches at portions of the stator core to be opposed to the rotor; and a winding that is wound around each of the teeth so as to be arranged in each of the slots, wherein the teeth are each formed to protrude toward an outer circumferential surface of the rotor and each have a tapered shape in which a tooth width decreases toward a distal end portion thereof, wherein the winding comprises an edgewise winding wound around the each of the teeth in a row, and is configured to be supplied with power so that a terminal on a base portion side of the each of the teeth has a higher voltage than a voltage of a terminal on the distal end portion side of the each of the teeth, and wherein the base portion of the each of the teeth has a tooth width $T_h$ that is set within a range of $T_{min} < T_h < 1.25 T_{ha}$ defined by a tooth width $T_{ha}$ that maximizes a value of the following expression representing an index $F(T_h)$ of insulating performance, loss performance, and magnetic saturation performance, and a permissible lower limit $T_{min}$, $$F(T_h) = -\frac{T_h^4}{\cos(\beta)} + \left(2(D - T_c)\tan\frac{\alpha}{2} - 2(h+a)\right)T_h^3$$

where D represents an outer radius of the stator core, $T_C$ represents a core back width of the stator core, h represents a winding width, a represents an air gap between the each of the teeth and the winding, α represents a pitch of the each of the teeth and the each of the slots, and β represents an inclination angle of the winding.

2. A stator for a rotating electric machine according to claim 1, wherein the permissible lower limit $T_{min}$ is set to be 0.61 times as large as the tooth width $T_{ha}$ that maximizes the value of the expression.

3. A stator for a rotating electric machine according to claim 1, wherein the permissible lower limit $T_{min}$ is set to the tooth width $T_{ha}$ that maximizes the value of the expression.

4. A stator for a rotating electric machine according to claim 1, wherein a clearance between a first winding and a second winding adjacent to the first winding among the windings wound around the teeth increases monotonously toward an outer shape of the stator.

5. A stator for a rotating electric machine according to claim 1, wherein, when a number of poles of the rotor and a number of the slots of the stator have a ratio of (3±1):3, and a greatest common divisor of the number of the poles and the number of the slots is represented by P, a number of parallel connections of the windings is set to a value equal to the greatest common divisor P.

6. A stator for a rotating electric machine according to claim 1, further comprising an insulating member interposed between the stator core and the winding and between the each of the teeth and the winding,
wherein the insulating member has a thickness set to become smaller toward the distal end portion of the each of the teeth.

7. A stator for a rotating electric machine according to claim 1, further comprising a flange formed on the distal end portion of the each of the teeth.

8. A method of manufacturing the stator for a rotating electric machine according to claim 1,
the method comprising:
a first step of manufacturing a stator core so that teeth are formed to protrude from an inner circumferential portion of the stator core at equal pitches, the teeth each having a tapered shape in which a tooth width decreases toward a distal end portion thereof;
a second step of manufacturing a coil with the edgewise winding;
a third step of inserting the coil manufactured in the second step into a first insulating member in order to insulate the coil from the stator core manufactured in the first step;
a fourth step of inserting the first insulating member, which has the coil inserted therein in the third step, into the stator core;
a fifth step of arranging the stator core, which has the first insulating member inserted therein in the fourth step, in an annular pattern;
a sixth step of fitting the stator core, which is arranged in the annular pattern in the fifth step, into a frame; and
a seventh step of inserting a second insulating member into a clearance between a first coil and a second coil adjacent to the first coil among the coils in the stator core fitted into the frame in the sixth step.

9. A stator for a rotating electric machine, which is to be arranged to be opposed to a rotor, the rotor having a different magnetic resistance depending on a rotational position thereof, the stator being configured to construct a rotating electric machine together with the rotor, the rotor and the stator having a ratio of a number of poles and a number of slots of (12±2):12,
the stator comprising:
a stator core;
teeth and the slots, which are formed at equal pitches at portions of the stator core to be opposed to the rotor; and
a winding that is wound around each of the teeth so as to be arranged in each of the slots,
wherein the teeth are each formed to protrude toward an outer circumferential surface of the rotor and each have a tapered shape in which a tooth width decreases toward a distal end portion thereof,
wherein the winding comprises an edgewise winding wound around the each of the teeth in a row, and is configured to be continuously wound around, among the teeth, a first tooth and a second tooth adjacent to each other while inverting a winding direction thereof so that a first winding portion is formed on the first tooth and a second winding portion that has a winding direction opposed to a winding direction of the first winding portion is formed on the second tooth, and be supplied with power so that a terminal on a base portion side of the first tooth has a higher voltage than a voltage of a terminal on a base portion side of the second tooth, and
wherein a base portion of the each of the teeth has a tooth width $T_h$ that is set within a range of $T_{min}<T_h<1.25T_{ha}$ defined by a tooth width $T_{ha}$ that maximizes a value of the following expression representing an index $F(T_h)$ of insulating performance, loss performance, and magnetic saturation performance, and a permissible lower limit $T_{min}$, $$F(T_h) = -\frac{T_h^4}{\cos(\beta)} + \left(2(D - T_c)\tan\frac{\alpha}{2} - 2(h + a)\right)T_h^3$$

where D represents an outer radius of the stator core, $T_C$ represents a core back width of the stator core, h represents a winding width, a represents an air gap between the each of the teeth and the winding, α represents a pitch of the each of the teeth and the each of the slots, and β represents an inclination angle of the winding.

* * * * *